United States Patent

Sugihara et al.

[11] Patent Number: 5,806,971
[45] Date of Patent: Sep. 15, 1998

[54] LAMP DEVICE

[75] Inventors: Masanori Sugihara, Himeji; Yoshiharu Kamatani, Hyogo-ken, both of Japan

[73] Assignee: Ushiodenki Kabushiki Kaisha, Tokyo, Japan

[21] Appl. No.: 681,435

[22] Filed: Jul. 23, 1996

[30] Foreign Application Priority Data

Aug. 30, 1995 [JP] Japan ................................. 7-221524

[51] Int. Cl.⁶ ....................................................... F21V 7/20
[52] U.S. Cl. ...................... 362/264; 362/263; 362/294; 313/318.08; 313/318.11
[58] Field of Search ................................. 362/294, 296, 362/263, 264, 267; 313/318.02, 318.03, 318.08, 318.11

[56] References Cited

U.S. PATENT DOCUMENTS

| | | | |
|---|---|---|---|
| 4,423,348 | 12/1983 | Greiler | 362/294 |
| 4,772,989 | 9/1988 | Haraden | 362/263 |
| 4,774,636 | 9/1988 | Gaugel et al. | 362/263 |
| 5,253,153 | 10/1993 | Mathews et al. | 362/263 |
| 5,506,464 | 4/1996 | Ooms | 313/318.11 |

*Primary Examiner*—Thomas M. Sember
*Attorney, Agent, or Firm*—Sixbey, Friedman, Leedom & Ferguson; David S. Safran

[57] ABSTRACT

A lamp device in which the lamp can be reliably held and moved for adjustment of its position with respect to a concave reflector without being damaged, and in which the position of the lamp can be adjusted with high accuracy is achieved by providing a concave reflector with a cylindrical neck in its center bottom area and a lamp in which there is a hermetically sealed portion on at least one of its ends, and which is arranged with the hermetically sealed portion inserted through the neck of the concave reflector. Furthermore, according to the invention, the lamp device has a lamp base which is attached on the hermetically sealed portion of the lamp, and which extends in the axial direction of the lamp, and has a sleeve component formed of a cylindrical reflector holding portion and a cylindrical lamp base holding portion that are integrally united as one-piece, and in which in the reflector holding portion the neck of the concave reflector is attached. According to the invention, the lamp base is attached in the lamp base holding portion of the sleeve component with an adhesive in the state in which it projects from the outer end thereof.

4 Claims, 2 Drawing Sheets

LAMP DEVICE

BACKGROUND OF THE INVENTION

1. Field of the invention

The invention relates to a lamp device which is formed by a combination of a lamp with a concave reflector.

2. Description of Related Art

A lamp device which is formed, for example, by a combination of a discharge lamp of the short arc type with a concave reflector is suitably used as a light source device of a liquid crystal projector, or for general illumination and the like.

In FIG. 3, one example of a conventional lamp device is schematically depicted. In the figure, a concave reflector 70 has a light reflection portion 71 which is parabolic, for example, and in its center bottom area, a cylindrical neck 72 is formed.

A discharge lamp 80 of the short arc type has a bulb with a spherical enlargement 81 which surrounds an emission space, and on opposite ends of which hermetically sealed portions 82 and 83 are formed. The hermetically sealed portion 82 is arranged in the neck 72 of the concave reflector 70. Within the enlargement 81 of this discharge lamp 80 is a pair of opposed electrodes 84, 85. The bases of electrodes 84 and 85 are each connected to a respective one of metal foils 86 and 87, which are hermetically sealed in the hermetically sealed portions 82 and 83. The metal foils 86 and 87 are connected to outer lead pins 88 and 89, respectively, which extend from hermetically sealed portions 82 and 83 to the outside.

A sleeve component 90 for connecting the concave reflector 70 to the discharge lamp 80 has a cylindrical reflector holding portion 91 and a cylindrical lamp holding portion 92 which are continuously and integrally united. The cylindrical reflector holding portion 91 has an inside diameter which is greater than or equal to the outside diameter of neck 72 of the concave reflector 70, and the cylindrical lamp holding portion 92 has an inside diameter which is greater than the width of the hermetically sealed portion 82 of discharge lamp 80.

Within the concave area which is formed in the reflector holding portion 91 of this sleeve component 90, the neck 72 of concave reflector 70 is inserted and attached by means of an adhesive 76. On the other hand, in the cylindrical opening of the lamp holding portion 92 of the sleeve component 90, the hermetically sealed portion 82 of the discharge lamp 80 is inserted and attached using adhesive 77.

In a lamp device which, for example, is used for a liquid crystal projector, it is necessary to arrange the discharge lamp 80 such that a bright spot which is formed between its electrodes 84 and 85 is positioned with respect to the focal point of concave reflector 70 with high accuracy in order to obtain high light efficiency. Therefore, in this lamp device, adjustment of the position of discharge lamp 80, described below, relative to the concave reflector 70 is performed, and thus, the lamp device is produced.

First, the concave reflector 70 which is attached in reflector holding portion 91 of sleeve component 90 is restrained in a fixed position, the hermetically sealed portion 82 of discharge lamp 80 is inserted in the cylindrical opening of neck 72 of concave reflector 70 and in the cylindrical opening of lamp holding portion 92 of sleeve component 90, and the discharge lamp 80 is arranged such that the enlargement 81 is positioned within the light reflection portion 71 of concave reflector 70.

Then, the outer lead pin 88 is held by means of a suitable position adjustment device which has a holder, and the discharge lamp 80 is moved with respect to concave reflector 70, until it is arranged in a position in which the maximum illumination intensity can be obtained by operating discharge lamp 80, for example, to project light onto a screen. Discharge lamp 80, in this state, is fixed in the sleeve component 90 by injecting and setting the adhesive in the cylindrical opening for lamp holding portion 92 of sleeve component 90.

However, in the arrangement of the above described lamp device, the following disadvantages arise with respect to its manufacture:

The outer lead pin 88 has a small outside diameter and low strength, and therefore, cannot be reliably held. Consequently, it is difficult to adjust the position of the discharge lamp 80 with respect to the concave reflector 70 with high precision. Furthermore, there are cases in which the outer lead pin 88 is deformed or damaged when the outer lead pin 88 is held and the discharge lamp 80 is raised for a long time.

A means is also conceivable which holds both outer lead pins 88 and 89 and which moves discharge lamp 80. However, it is difficult, in this case, to exactly measure the illumination intensity for position adjustment since the light projected on the screen is shielded by the holder for the outer lead pin 89.

On the other hand, it is necessary for adjusting the position of discharge lamp 80 with a high degree of freedom to use a sleeve component 90 which has a lamp holding portion 92 with an inside diameter that is much larger than the hermetically sealed portion 82 of the discharge lamp 80. But, if this retaining component 90 is used, the disadvantage arises that, in the attachment of discharge lamp 80 in sleeve component 90, the workability of the latter decreases, since the adhesive which was injected into the cylindrical opening of lamp holding portion 92 of the sleeve component 90 leaks out of the end of the lamp holding portion 92.

SUMMARY OF THE INVENTION

Thus, a first object of the present invention is, therefore, to devise a lamp device in which the lamp can be reliably held and moved with respect to a concave reflector without being damaged, and in which the position of the lamp can be adjusted with high accuracy.

Another object of the invention is to devise a lamp device in which the adhesive used for attachment of the lamp in a sleeve component is prevented from leaking, in which work can be easily performed and in which, moreover, the position of the lamp relative to the concave reflector can be adjusted with a high degree of freedom.

The above objects and others are achieved according to a preferred embodiment of the invention in which a lamp device has a concave reflector which has a cylindrical neck in its center bottom area, and a lamp which has a hermetically sealed portion on at least one of its ends, the hermetically sealed portion being inserted in the neck of the concave reflector. Furthermore, a lamp base is attached in the hermetically sealed portion of this lamp and extends along the axial direction of the lamp, and a sleeve component has a cylindrical reflector holding portion integrally united with a cylindrical lamp base holding portion, the reflector holding portion is attached to the neck of the concave reflector, and the lamp base is attached in the lamp base holding portion of the sleeve component by means of an adhesive in the state in which it projects from the outer end thereof.

The object of the invention is, furthermore, advantageously achieved by the fact that, in the above described lamp device, on one outer face of the lamp base holding portion there is a cover which has a larger outside diameter than the inside diameter of the lamp base holding portion, and in which a through opening is formed with an inside diameter which corresponds to the outside diameter of the above described lamp base, in the state in which the lamp base is inserted.

In the following, the lamp device according to the invention is further described using the embodiment shown in the drawing.

DETAILED DESCRIPTION OF THE PREFERRED EMBODIMENT

Figure 1:
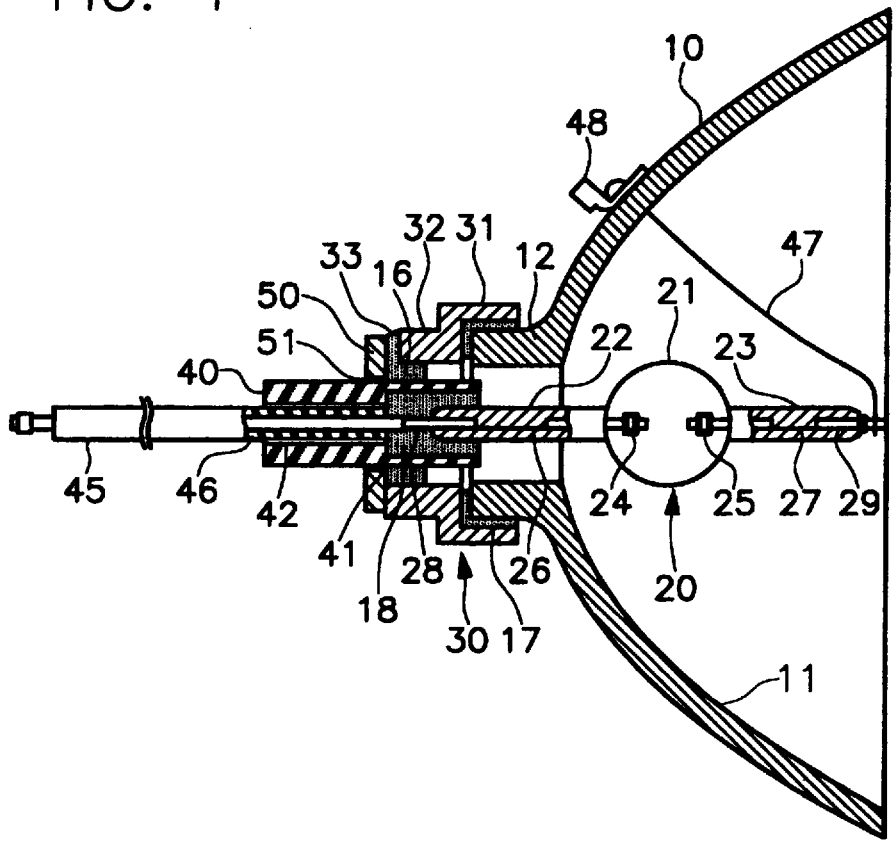
FIG. 1 schematically shows the arrangement of one embodiment of a lamp device according to the invention.

In FIG. 1, the arrangement of a preferred embodiment of a lamp device according to the invention is shown in which a concave reflector 10 has a light reflection portion 11 which is parabolic, for example, and in the center bottom area of which there is cylindrical neck 12 in one piece with it. The neck 12 extends in the axial direction of the concave reflector 10. This concave reflector 10 consists entirely of glass and has a dielectric, multilayer film on the surface of the light reflection portion 11.

A metal halide lamp 20 has a bulb comprising an essentially spherical enlargement 21 which surrounds an emission space, and on each of opposite ends of which respective hermetically sealed portions 22, 23 are formed. One of the hermetically sealed portions, in this case hermetically sealed portion 22, is arranged such that it is inserted axially through a cylindrical opening in the neck 12 of the concave reflector 10 so that it projects from the end of the neck 12.

Within enlargement 21 of the metal halide lamp 20 is a pair of opposed electrodes 24 and 25, each of which has base portion that is connected to a molybdenum metal foil 26, 27 which is hermetically sealed in a respective one of the hermetically sealed portions 22, 23. These metal foils 26, 27 are each connected to a respective outer lead pin 28, 29, which extend to the outside from its hermetically sealed portions 22, 23. Furthermore, encapsulated within enlargement 21 are halides of rare earth metals together with mercury and argon gas as a starting gas.

For the purpose of power supply, a lead wire 45 is attached to the outer lead pin 28 of metal halide lamp 20, and is connected, for example, by spot welding. Lead wire 45 is coated with a silicone resin coating material 46 and has a projecting portion on its tip. Furthermore, also for purposes of power supply, to the other lead pin 29 of the metal halide lamp 20 a leadwire 47 is connected. The lead wire 47 is connected to a supply terminal 48 which is located on the back of the light reflection portion 11 of the concave reflector 10.

A cylindrical lamp base 40, which is formed of a heat-resistant insulating material, for example, a ceramic, is arranged on the hermetically sealed portion 22 of the metal halide lamp 20, being attached such that it extends in the axial direction of the metal halide lamp 20. Specifically, the lamp base 40 is provided with cylindrical opening 41 with a large inside diameter that is greater than or equal to the width of the hermetically sealed portion 22 of metal halide lamp 20.

Adjacent to the cylindrical opening 41, a cylindrical opening 42 with a small diameter is formed. The inside diameter of opening 42 corresponds to the outer diameter of the power supply lead wire 45. In large diameter cylindrical opening 41, an outer end portion of the hermetically sealed portion 22 of the metal halide lamp 20 is inserted and is attached with an inorganic adhesive 18. Furthermore, the power supply lead wire 45 is inserted through the small diameter cylindrical opening 42.

A sleeve component 30 which is made of a heat-resistant insulating material, for example, of ceramic has a cylindrical reflector holding portion 31 with an inside diameter greater than or equal to the outside diameter of neck 12 of the concave reflector 10. The sleeve component 30 also has a cylindrical lamp base holding portion 32 which has an inside diameter that is greater than the outside diameter of lamp base 40. The holding portions 31 and 32 are continuous, being formed of a one-piece construction.

In a cylindrical opening of the reflector holding portion 31 of the sleeve component 30, the neck 12 of concave reflector 10 is inserted and attached by means of an inorganic adhesive 17. On the other hand, the lamp base 40 is inserted through the cylindrical opening of the lamp base holding portion 32 of the sleeve component 30, such that it projects from the end of the lamp base holding portion 32, and is attached in this state by means of inorganic adhesive 16.

The gap between the lamp base holding portion 32 of the sleeve component 30 and the lamp base 40 is in the area where the position of metal halide lamp 20 is adjusted. Therefore, it is desirable for the inside diameter of the lamp base holding portion 32 of sleeve component 30 to be about 3 to 6 mm larger than the outside diameter of the lamp base 40.

An injection opening 33, for injecting inorganic adhesive between the inside wall of lamp base holding portion 32 and lamp base 40, for example, is located at several points in the circumference of the lamp base holding portion 32.

Figure 2:
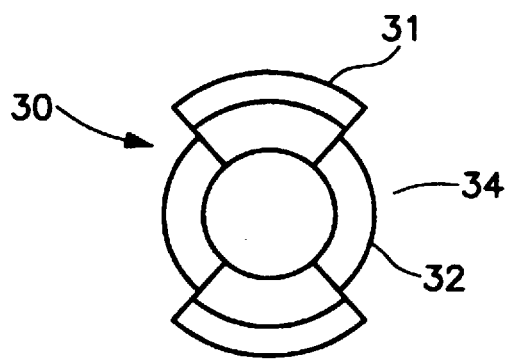
FIG. 2 is a front view of a sleeve component in the lamp device according to FIG. 1.
Figure 3:
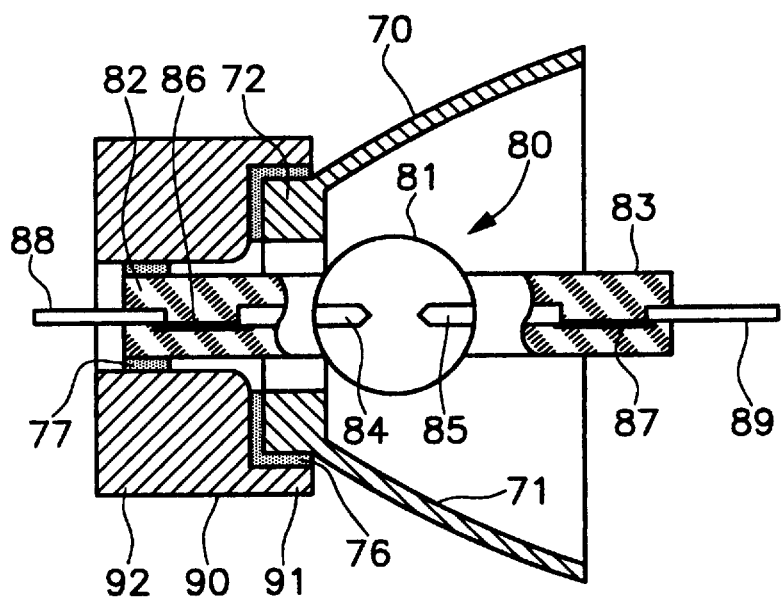
FIG. 3 is a schematic depiction of the arrangement of an example of a conventional lamp device.

Furthermore, as is shown in FIG. 2, in reflector holding portion 31 of sleeve component 30 several (two in the illustrated example) gaps 34 are formed along the circumference of the reflector holding portion 31. These gaps 34 are serve to allow the flow of cooling air for cooling the metal halide lamp 20 and concave reflector 10.

The outer end face of the lamp base holding portion 32 for sleeve component 30 is provided with a circular cover 50 which has a larger outside diameter than the inside diameter of the lamp base holding portion 32, and is formed in its center with a through opening 51 having an inside diameter which corresponds to the outside diameter of lamp base 40. Circular cover 50 is arranged with the lamp base 40 inserted through the opening 51. The clearance space between the lamp base holding portion 32 and the lamp base 40 is closed by this cover 50.

In the following, one example of the dimensioning of the above described lamp device is described.

The inside diameter is 17 mm and the outside diameter is 28 mm for neck 12 of concave reflector 10.

The maximum width of hermetically sealed portions 22 and 23 is 9 mm for metal halide lamp 20.

The inside diameter of the reflector holding portion 31 is 29.5 mm and the inside diameter of the lamp base holding portion 32 is 18 mm for sleeve component 30.

The lamp base 40 has an outside diameter of 12.4 mm and the inside diameter of its large diameter cylindrical opening 41 is 9.6 mm.

In the above described lamp device, each component is mounted, for example, in the manner described below, and thus the lamp device is produced.

First, neck 12 of concave reflector 10 is inserted in the cylindrical opening for reflector holding portion 31 of sleeve component 30 and is attached within the above described cylindrical opening by means of inorganic adhesive 17. Then, the projecting portion of power supply lead wire 45 is welded to the outer end of the outer lead pin 28 of metal halide lamp 20. The power supply lead wire 45 is inserted from the large diameter cylindrical opening 41 side of lamp base 40 through the small diameter cylindrical opening 42. Furthermore, the hermetically sealed portion 22 of the metal halide lamp 20 is inserted into the large diameter cylindrical opening 41 and is attached there by means of the inorganic adhesive 18.

Next, the concave reflector 10 is restrained in a fixed position. Metal halide lamp 20 is inserted in the cylindrical opening of lamp base holding portion 32 of sleeve component 30 and in the cylindrical opening of neck 12 of concave reflector 10. In addition, cover 50 is arranged such that the lamp base 40 is inserted in its through opening 51. In this state, the enlargement 21 is positioned within light reflection portion 11 of concave reflector 10. Then, with the lamp base 40 held by means of a suitable position adjustment device which has a holder, the metal halide lamp 20 is moved and is located in a position in which the highest illumination intensity can be obtained by operating metal halide lamp 20 and by projecting light onto a screen, for example.

Then, with the cover 50 pressed onto the end of the lamp base holding portion 32, inorganic adhesive is injected through the injection opening 33 of sleeve component 30 into the cylindrical opening of lamp base holding portion 32. In this way, lamp base 40 is attached within the cylindrical opening of the holding portion 32.

In the above described arrangement, by the measure by which lamp base 40 is located on a hermetically sealed portion 22 of metal halide lamp 20 by attachment, metal halide lamp 20 can be moved for adjusting its position with respect to the concave reflector 10 without damaging it by using the lamp base 40 as the held portion.

Furthermore, for lamp base 40, a lamp base can be used that has a size, shape, axial dimension and material which are suitable for a held portion. In this way, above described lamp base 40 can be held reliably and with strong force, so that, therefore, the position of metal halide lamp 20 can be adjusted with high accuracy.

Moreover, by using a lamp base with a set form, a special holder which corresponds to the shape of the above described lamp base can be used and the lamp base can always be held in constant state. In this way, high reliability can be obtained in the position adjustments of a plurality of lamps.

In addition, the arrangement of cover 50 on the end of lamp base holding portion 32 of sleeve component 30 prevents the adhesive injected into the cylindrical opening of lamp base holding portion 32 from leaking out of the end of the lamp base holding portion 32 when metal halide lamp 20 is attached in the lamp base holding portion 32 of sleeve component 30 by means of adhesive. In this way, the work of attaching lamp base 40 in lamp base holding portion 32 of sleeve component 30 can be easily performed.

Furthermore, according to the invention the inside diameter of the lamp base holding portion 32 of the sleeve component 30 can be much larger than the outside diameter of lamp base 40. In this way, the position of metal halide lamp 20 can be adjusted with a high degree of freedom.

According to the invention, moreover, by the measure by which several gaps 34 are formed in the circumference of the reflector holding portion 31 of sleeve component 30, the metal halide lamp 20 and concave reflector 10 can be cooled by the flow of cooling air through these gaps 34.

Furthermore, by the measure according to the invention by which the outer lead pin of the metal halide lamp 20 and the power supply lead wire 45 are connected to one another within sleeve component 30, insulation for a high voltage pulse used for lighting operation or restarting of lighting operation of the metal halide lamp 20 can be increased.

The invention is not limited to the above described lamp device, but various changes can be made. For example, as the concave reflector, a concave reflector can be used which has an elliptical light reflection portion. Instead of the metal halide lamp 20, a discharge lamp of the short arc type with a different arrangement can be used.

Furthermore, injection opening 33 for adhesive is not absolutely necessary for sleeve component 30. In this case, by injecting adhesive from gaps 34 formed in reflector holding portion 31, lamp base 40 can be attached in sleeve component 30.

ACTION OF THE INVENTION

Using the lamp device according to the invention, by the arrangement of the lamp base on the hermetically sealed portion of the lamp, the position of the lamp can be adjusted with respect to the concave reflector without damage by using the lamp base as the held portion. Furthermore, according to the invention the lamp base can be reliably held, and therefore, the lamp position can be adjusted with high accuracy.

Additionally, according to the invention, the arrangement of the cover on the end of the lamp base holding portion of the sleeve component prevents leakage of the adhesive from the end of the lamp base holding portion when the lamp is attached in the lamp base holding portion for the sleeve component. This simplifies the work of attachment of the lamp base in the lamp base holding portion of the sleeve component, and furthermore, a much larger inside diameter of the lamp base holding portion of the sleeve component than the outside diameter of the lamp base can be used. Therefore, the position of the lamp can be adjusted with a high degree of freedom.

It is to be understood that although a preferred embodiment of the invention has been described, various other embodiments and variations may occur to those skilled in the art. Any such other embodiments and variations which fall within the scope and spirit of the present invention are intended to be covered by the following claims.

What we claim is:

1. A lamp device comprising:
   a concave reflector which has a cylindrical neck in a center bottom area thereof,
   a lamp having a hermetically sealed portion on at least one end thereof, and which is arranged with said hermetically sealed portion inserted in the neck of said concave reflector;
   a lamp base within which the hermetically sealed portion of said lamp is attached, and which extends in an axial direction of the lamp; and
   a sleeve component which comprises a cylindrical reflector holding portion integrally united with a cylindrical lamp base holding portion, the neck of said concave reflector being attached in the reflector holding portion and the lamp base being attached in the lamp base holding portion of the sleeve component by means of an adhesive.

2. Lamp device according to claim 1, wherein a cover is disposed on an outer end face of the lamp base holding portion of the sleeve component, said cover having a larger outside diameter than an inside diameter of the lamp base holding portion, and having a through opening with a diameter which corresponds to an outside diameter of the lamp base which is inserted therein.

3. Lamp device according to claim 1, wherein the lamp base holding portion of the sleeve component has at least one radial adhesive injection opening in a circumference of the cylindrical lamp base holding portion.

4. Lamp device according to claim 1, wherein the reflector holding portion of the sleeve component is provided with a plurality of circumferential gaps formed therein as a means for cooling the lamp and concave reflector by a flow of cooling air.

* * * * *